United States Patent [19]

Born et al.

[11] Patent Number: 4,892,465

[45] Date of Patent: Jan. 9, 1990

[54] AUTOMATIC CONTROL FOR VARIABLE DISPLACEMENT PUMP

[75] Inventors: Ellis H. Born, Upper Arlington; David L. Thurston, Ashley; Lee A. DeBoer, Worthington, all of Ohio

[73] Assignee: Hagglunds Denison Corporation, Columbus, Ohio

[21] Appl. No.: 244,038

[22] Filed: Sep. 14, 1988

[51] Int. Cl.⁴ .............................................. F04B 49/08
[52] U.S. Cl. .................................... 417/218; 60/452
[58] Field of Search ............... 417/218, 222; 60/445, 60/452

[56] References Cited

U.S. PATENT DOCUMENTS

| | | | |
|---|---|---|---|
| 3,865,514 | 2/1975 | Lonnemo | 60/452 |
| 4,244,678 | 1/1981 | Uehara et al. | 417/218 |
| 4,245,962 | 1/1981 | Uehara et al. | 417/218 |
| 4,293,284 | 10/1981 | Carlson et al. | 417/218 |
| 4,518,322 | 5/1985 | Nonnenmacher | 417/222 |
| 4,523,430 | 6/1985 | Masuda | 417/222 |
| 4,631,005 | 12/1986 | Warren et al. | 417/218 |

FOREIGN PATENT DOCUMENTS

| | | | |
|---|---|---|---|
| 2350766 | 7/1974 | Fed. Rep. of Germany | 417/218 |
| 167501 | 10/1982 | Japan | 60/415 |

Primary Examiner—Leonard E. Smith
Attorney, Agent, or Firm—Thomas S. Baker, Jr.

[57] ABSTRACT

A control for a variable displacement pump in which a displacement control element is made responsive to a load sensing valve and a pilot pressure relief valve. A control fluid is supplied to the pressure relief valve and the load sensing valve and the control pressure fluid controls the working pressure fluid which operates the stroking piston for the pump.

5 Claims, 2 Drawing Sheets

AUTOMATIC CONTROL FOR VARIABLE DISPLACEMENT PUMP

BACKGROUND OF THE INVENTION

A variable displacement pressure compensated pump provides a constant rate of flow of working pressure fluid from the pump without exceeding a set maximum pressure. When the pressure of the working fluid output from the pump reaches the maximum pressure setting the displacement control automatically reduces the displacement of the pump until fluid output from the pump has a pressure equal to the maximum pressure setting for the pump. When the pressure of the fluid output from the pump decreases the displacement control increases the displacement of the pump until the pressure of the fluid output from the pump attains the maximum pressure setting for the pump.

The variable displacement pump may include a plurality of pistons mounted in longitudinal bores formed in a rotatably mounted pump barrel. Each piston may have a shoe pivotally attached to a head end which projects from the barrel. The shoes may be retained against a thrust plate formed on one surface of a hanger or rocker cam which pivots within the housing about an axis perpendicular to that of the piston bores. A prime mover may be utilized to rotate the barrel such that the pistons reciprocate as the piston shoes slide across the thrust plate.

This reciprocating movement of the pistons causes fluid to be drawn into the piston bores at low pressure and expelled therefrom at high pressure. The angle of the pivoting thrust plate determines the displacement of the pump. If the thrust plate surface extends in a plane perpendicular to the axis of the piston bores the shoes will not reciprocate as the barrel is driven and no displacement of fluid will occur. Conversely, if the hanger or rocker cam is pivoted such that the thrust plate surface extends other than at a right angle with respect to the piston bores the pistons will reciprocate as the shoes slide across the thrust plate surface and displacement of the fluid will occur. Displacement of the pump increases as the thrust plate surface angle increases from the zero displacement position or the position in which the thrust plate surface extends perpendicular to the rotational axis of the pump.

In a typical pressure compensated variable displacement pump a spring acts against the hanger or rocker cam to bias it towards a position of maximum fluid displacement. The maximum displacement of the pump will be set by a stop which may be adjustable to limit the maximum angle the hanger or rocker cam may pivot away from the zero displacement position. Typically a fluid actuated stroking piston engages the pump hanger or rocker cam and acts in opposition to the spring to reduce the displacement of the pump upon receipt of control fluid from a pressure compensator valve.

A pressure compensator valve may simply comprise a spring and a control element. The spring acts on the control element and functions to set the maximum allowable working pressure of the pump. The opposite end of the control element may be connected to a source of control or working pressure fluid. This fluid acts upon the control element in opposition to the spring. The control element may comprise a spool having a land movable longitudinally within a spool bore. In one position of the control element a fluid conduit connected to the stroking piston is connected to tank, in another position of the control element the fluid conduit connected to the stroking piston is connected to a source of working pressure and in a centered position between the one and the other positions the fluid conduit connected to the stroking piston is blocked. The control element constantly modulates between the one and the other position. In the one position of the control element the pump is at the maximum displacement position. However, in the other position of the control element working pressure fluid flows to the fluid conduit connected to the stroking piston to cause the piston to rotate the hanger or rocker cam to a position of reduced fluid displacement against the action of the hanger spring. Working pressure fluid is supplied to this conduit to reduce the displacement of the pump until the pressure of the working fluid is reduced to the maximum allowable pressure set by the spring acting on the control element. Such a basic pressure compensated pump control may be seen in U.S. Pat. No. 4,289,452.

In a typical hydraulic system the working pressure fluid output from the pump may be utilized to power a plurality of devices. Typically, fluid may be supplied to these devices through a conventional four-way valve. In such a system the demand for working pressure fluid may vary considerably. Rarely does the system call for working pressure fluid at the maximum pressure setting of the pump. Consequently, a great deal of energy and heat may be conserved if the pressure of the working fluid output from the pump is modulated to respond to the demands of the system. Such modulation may be achieved by changing the maximum pressure setting of the compensator valve in response to changes in demands of the system. An electromechanical device for changing the maximum pressure setting of a pressure compensator valve may be seen in U.S. Pat. No. 4,715,788. However, an electromechanical system in most instances would not be used on hydraulic systems which do not have a ready supply of electrical power such as some types of drilling equipment, mining equipment or construction machinery. In these types of systems purely mechanical devices may be utilized.

One problem with a purely mechanical system resides in attempting to modulate the setting of the pressure compensator valve as the load requirements of the hydraulic system varies. The requirements of the hydraulic system may be sensed by examining the outputs of the four-way valves which are connected to the hydraulic devices in the system to be driven by the output of the pump. If these outputs are connected to a single line through a combination of shuttle type check valves that line may act as a load sensing line or port. It has been found to be undesirable to directly connect the load sensing port to the pressure compensator valve to vary the output of that valve in response to the system demand. Such a direct connection requires relatively large fluid passages, e.g. on the order of approximately 0.125 inches or more, valves having large poppets and seats and greatly reduces the response of the system because of the size of the components and because of the relatively large amounts of fluid which must be handled. It has been found desirable to provide a control which utilizes a source of pilot fluid in connection with a pressure compensator valve and which isolates the load sensing fluid from the pressure compensator valve. In this way the compensator valve components may be made very small and the valve may have a high response.

SUMMARY OF THE INVENTION

An automatic control for a variable displacement pressure compensated pump having a displacement setting device movable between a maximum displacement position and a minimum displacement position and including a stroking piston. A first spring acts on the displacement setting device to move the pump to the maximum displacement position and a first fluid conduit is connected to the displacement setting device and adapted to receive or discharge control pressure fluid from the control to move the piston and thereby vary the displacement of the pump. An automatic control comprises a pilot operated compensator having a compensator sleeve, a first port in the sleeve connected to the first fluid conduit, a compensator spool movable in the sleeve and a control land formed on the spool which cooperates with the first port of the sleeve. A source of pressure fluid to the control also is provided. A control includes a second fluid conduit means for connecting the pressure fluid to one side of the control land. A case or tank adapted to receive low pressure fluid is connected through a third fluid conduit means to the other side of the land. The compensator spool moves between a first control position in which the control land blocks the case pressure fluid from the first port and connects the control pressure fluid source to the first port to overcome the force of the first spring and bias the stroking piston to a position of reduced fluid displacement and a second position in which the control land blocks the control pressure fluid source from the first port and connects the case pressure fluid to the first port to drain fluid from the first fluid conduit to allow the first spring to bias the stroking piston to a position of increased fluid displacement with a third control position in which the control land blocks both the control pressure fluid source and the tank pressure fluid from the port to substantially maintain the set pump displacement. The pump further includes a second spring means for biasing the control spool to the second control position, a first control orifice formed in the control piston, a source of pilot fluid and a fourth fluid conduit means for connecting the pilot fluid to the upstream side of the first control orifice wherein the compensator spool will shift to the first control position when the flow of pilot fluid causes a pressure to drop which overcomes the force of the second spring means. The control includes a pilot pressure relief valve which provides the maximum pressure setting for the pump. This control also includes a fifth fluid conduit means for connecting the pilot relief valve to the downstream side of the first control orifice for receipt of pilot fluid therefrom to enable the pilot fluid to flow through the first control orifice when the maximum pressure setting of the pump is obtained. The control further includes a load sensing relief valve which provides a load modulated pressure setting for the pump having an inlet port and an exhaust port connected to case. The load sensing relief valve incorporates a load responsive pressure setting means. A sixth pilot fluid conduit means connects the inlet port of a load sensing relief valve to the downstream side of the first control orifice for receipt of pilot fluid therefrom and the load sensing relief valve is movable between a first position in which the sixth pilot fluid conduit is blocked and a second position in which the sixth pilot fluid conduit is connected to case when the setting of the load responsive pressure setting means of the load sensing relief valve is obtained. The system includes a damping orifice positioned downstream of the control orifice which orifice is common to both the fifth and the sixth pilot fluid conduit means.

DESCRIPTION OF THE PREFERRED EMBODIMENT

Figure 1:
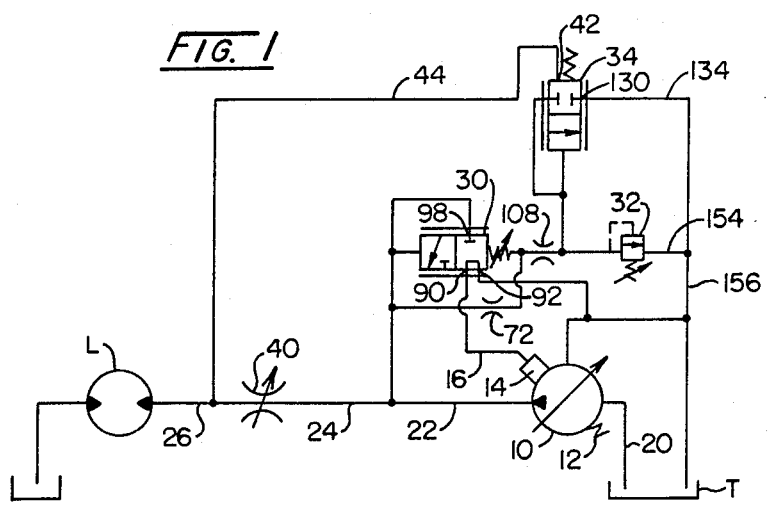
FIG. 1 is a schematic diagram of the automatic control of the present invention and its installation in a hydraulic circuit having a variable displacement pump and a load sensing output line.

Turning to FIG. 1 of the drawings, a variable displacement pump (10) incorporates a spring (12) which acts to bias the displacement altering mechanism to the full or maximum displacement position and a stroking piston (14) which may receive a control fluid through a fluid conduit (16) to cause the displacement varying mechanism to act in opposition to the spring (12) and reduce the displacement of the pump and which may discharge control fluid through the fluid conduit (16) to enable the spring (12) to move the displacement varying mechanism towards the maximum displacement position. A fluid conduit (20) connects the inlet of pump (10) to tank T which provides a source of fluid. The pump discharges working pressure fluid through a fluid conduit (22) which may be connected to a load L through conduits (24) and (26). In FIG. 1 load L has been depicted as a fluid motor but may be in the form of a hydraulic cylinder, transmission or other device which utilizes pressurized hydraulic fluid to do work. The automatic control (28) of the present invention incorporates a stroke control valve (30), a valve (32) and a load sensing valve (34). Pressure relief valve (32) functions to limit the maximum pressure of the working fluid which may be discharged from the pump (10) and load sensing valve (34) functions to modulate the maximum pressure of the working fluid discharged from the pump (10) in response to the requirements of the load L being driven by the pump.

The stroke control valve (30) acts to adjust the displacement of the pump (10) to ensure that the pressure of the working fluid discharged from the pump does not exceed the setting of one of the load sensing valve (34) or the pressure relief valve (32). The stroke control valve (30) is a slave to the load sensing valve (34) up until the discharge pressure of the working fluid attains the setting of pressure relief valve (32).

In a conventional hydraulic system a control valve which may be depicted as a variable orifice (40) may be utilized to control the flow of working pressure fluid to the load L. Consequently, the pressure of the working fluid required to drive the load L will be reflected in the fluid conduit (24 and 26) between the load L and the variable orifice (40). By connecting the load sensing port (42) of load sensing valve (34) to fluid conduit (24 and 26) through a fluid conduit (44) the pressure of the working fluid required to drive the load L may be seen at that port. In a typical application where multiple loads are driven by the output of a single pump through individual four-way valves, the output of each four-way valve may be connected to fluid conduit (44) through a shuttle type check valve. In this manner the pressure of the fluid in conduit (44) will always be that of the fluid having the highest pressure. Consequently, load sensing valve (34) will always provide a setting for stroke control valve (30) sufficient to ensure that the working pressure fluid requirements of the greatest load are met in a manner described hereinafter.

Figure 2:
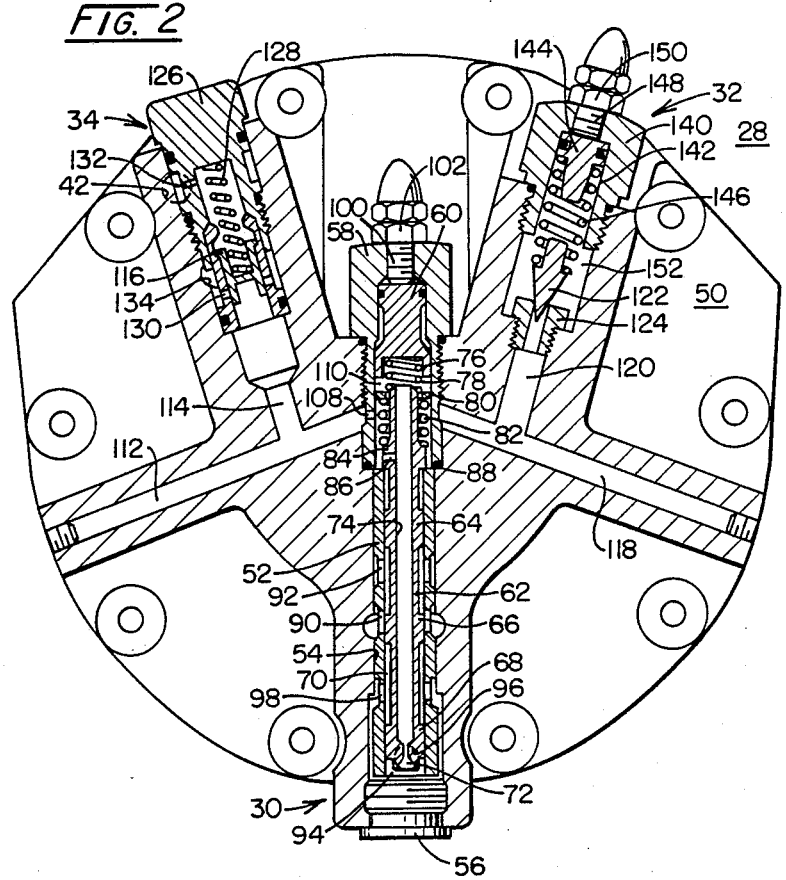
FIG. 2 is a cross-sectional view of a cover plate which houses the control of the present invention and which is adapted to be mounted on a variable displacement pump.

The detailed construction of the automatic control of the subject invention illustrated schematically in FIG. 1 may be seen by referring to FIG. 2. Stroke control valve (30), pressure relief valve (32) and load sensing valve (34) are mounted in a cover plate housing (50) which attaches to the variable displacement pump (10). Stroke control valve (30) consists of a sleeve (52) mounted in a housing bore (54). Longitudinal movement of sleeve (52) in bore (54) is prevented by a plug (56) threaded into one end of bore (54) and by a housing (58) for an adjustable stop and spring guide (60) threaded into the opposite end of bore (54). An axially movable spool (62) having a plurality of lands (64), (66) and (68) slides within a central bore (70) of sleeve (52). Spool (62) has a small bore (72) at one end which defines a control orifice and which opens into an axial bore (74) which is open at the other end. A light low rate spring (76) having one end housed within a recessed bore (78) of adjustable stop and spring guide (60) acts against a washer (80) which slides over a reduced diameter portion of spool (62) and cooperates with a heavy high rate spring (82) which acts against a shoulder (84) to bias spool (62) downwardly to where a second shoulder (86) on spool (62) engages an end (88) of sleeve (52). In this position of spool (62) within sleeve (52), land (66) which constitutes the control land for spool (62) opens a control port (90) formed in sleeve (52) such that the port connects through a fluid passage formed between lands (66) and (64) to a port (92) which connects to the pump case or tank T through internal passages in the pump housing.

It should be noted that internal passages within the housing of pump (10) also provide a source of working pressure fluid to a space (94) formed between plug (56) and control orifice (72) and around the end of sleeve (52) through a fluid conduit (96). This fluid enters a port (98) in sleeve (52) and acts against one end of land (66). When the pressure of the working fluid exceeds the setting of either the load sensing valve (34) or the pressure relief valve (32), spool (62) will overcome the force exerted by springs (76) and (82) and move axially within bore (70) to where control port (90) receives working pressure fluid which enters port (98). It may be observed that control port (90) connects to stroking piston (14) through fluid conduit (16) as illustrated in FIG. 1. Consequently, when working pressure fluid from port (98) flows into control port (90) the pressure fluid acts to move the stroking piston to reduce the displacement of the pump (10). Alternatively, when control port (90) connects to tank T through port (92) any pressure fluid in conduit (16) drains to tank and spring (12) acts to increase the displacement setting of pump (10).

It may be observed that light spring (76) and heavy spring (82) act in series to bias the spool (62) to a position in which control port (90) is open to tank and the pump (10) is set at the maximum displacement position. A threaded adjustment screw (100) in one end of housing (58) acts against adjustable stop and spring guide (60) to provide a desired preload on springs (76) and (82) with which to act against spool (62). A locknut (102) secures the position of adjustment screw (100). The preload force provided by adjustment screw (100) is adjusted to provide an initial preload or pressure setting for the compensator valve (30). A typical setting may be a preload of approximately 100 psi pressure required to operate the stroke control independent of the setting of pressure relief valve (32) or load sensing valve (34).

As stated above, the light spring (76) and heavy rate spring (82) are connected serially. Typically, the light rate spring (76) functions to bias spool (62) to the full displacement position depicted in FIG. 2 when the pressure drop of fluid flowing through central orifice (72) is less than the preload on springs (76) and (82). The heavy rate spring (82) does not act until fluid forces push spool (62) upward and light rate spring (76) has been fully compressed. The advantage of having a light rate spring and a heavy rate spring serially connected is to provide an increased range of motion of the spool (62) within sleeve (52). This motion provides sufficient movement of spool (62) that control port (90) alternatively may be opened to tank through port (92), may be blocked by control land (66) or may be opened to working pressure fluid in port (98).

An orifice (108) in the side of adjustable stop and spring guide (60) provides an outlet for fluid from a chamber (110) adjacent the end of spool (62) which receives fluid from axial bore (74) subsequent to its passage through control orifice (72). Orifice (108) opens simultaneously to fluid conduits (112) and (114) which connect to piston (116) within load sensing valve (34) and to fluid conduits (118) and (120) which open to a cone (122) and seat (124) of relief valve (32).

Load sensing valve (34) includes a spring housing (126) for a spring (128) which biases piston (116) to the position depicted in FIG. 2. Spring housing (126) has a pair of ports (130) and (132). Port (130) connects to a line (134) leading to tank (1) and port (132) connects to load sensing port (42). Consequently, pressure fluid in load sensing port (42) combines with spring (128) to bias piston (116) to the position shown in FIG. 2 in which port (130) is closed. When the pressure of the working fluid as reflected at port (98) of stroke control valve (30) exceeds the pressure of the fluid at load sensing port (42) plus the pressure caused by the preload of load sensing valve spring (128) and the preload of stroke control springs (76) and (82), the piston (116) and load sensing valve (134) will be moved against the force of spring (128) to thereby open port (130) to tank line (134). In turn this will allow fluid in port (98) to flow through control orifice (72) through axial bore (74), and through damping orifice (108) to tank.

The pressure drop caused by the passage of control fluid through control orifice (72) will cause stroke control spool (62) to move upward and thereby connect control port (92) to the working pressure fluid in port (98). This will cause working pressure fluid to be supplied to stroking piston (14) through fluid conduit (16) to destroke the pump until the output of working pressure fluid equals the pressure of the fluid at load sensing port (42) plus the preload pressure caused by load sensing spring (128) and stroke control springs (76) and (82). When this pressure has been attained load sensing piston (116) will move to restrict port (130) and compensator spool (62) will shift to cause control land (66) to momentarily block control port (90) to thereby maintain a set displacement of pump (10).

Relief valve (32) functions in a manner somewhat similar to that of load sensing valve (34) in that it provides a pressure setting for controlling the stroke control valve (30). However, whereas load sensing valve (34) responds to the pressure of working fluid required to drive a particular load, relief valve (32) functions to provide a maximum output pressure of working fluid from the pump (10). In other words, load sensing relief valve (34) controls stroke control valve (30) up until the maximum pressure setting of pressure relief valve (32) is attained by the working pressure fluid at which time relief valve (32) controls stroke control valve (30). Pressure relief valve (32) includes a spring housing having a bore (142) which contains a spring retainer (144) which in turn mounts one end of a spring (146) having its other end seated on cone (122). An adjustment screw (148) which acts against the top of retainer (144) provides a setting for the relief valve (32) once the adjustment for the setting has been made the adjustment screw position may be secured by a locknut (150). Consequently, the pressure of working fluid which appears at port (98) and flows through control orifice (72), central bore (74), and damping orifice (108) passes through bores (118) and (120) to act on cone (122) seated against seat (124).

When the pressure of this fluid exceeds the setting of relief valve (32), cone (152) will lift from seat (124) and pressure fluid will pass into spring chamber (152) which connects through internal passages to fluid conduit (154) which is connected to tank T through fluid conduit (156). When working fluid pressure exceeds the setting of relief valve (32) and fluid spills through cone and seat (122) and (124) stroke control valve (30) functions in the same manner as when the setting of load sensing relief valve (34) has been exceeded and fluid flows through port (130) into line (134). Such flow causes spool (62) to lift and control land (66) to move to connect pressure fluid in port (98) to port (90) and to stroking piston (14) through fluid conduit (16) to thereby reduce the displacement of pump (10). When the working fluid pressure has been reduced to the setting of relief valve (32) plus the preset preload pressure setting of the stroke control valve, cone (122) again will seat, spool (62) will move downwardly to cause control land (66) to thereby modulate pressure in control port (90) and the displacement of pump (10) will be positioned until further changes in the output pressure of working fluid occurs or until the load requirements change.

It may be observed that in FIG. 2 a common damping orifice (108) has been inserted between fluid passages (112) and (114) leading to piston (116) in load sensing valve (34) and fluid passages (118) and (120) leading to cone and seat (122) and (124) of relief valve (32). Alternatively, a separate damping orifice could be provided for fluid conduits (112) and (114) leading to load sensing valve (34) and for the fluid conduits (118) and (120) leading to relief valve (32). In fact, initially the subject control was provided with such parallel orifices. However, the use of parallel damping orifices unexpectedly caused an undesirable phenomena.

Figure 3:
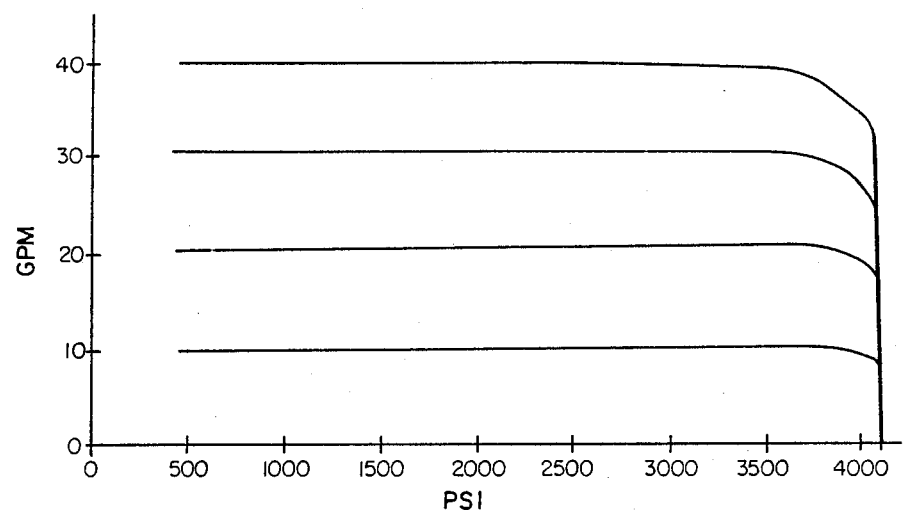
FIG. 3 illustrates a premature decrease in working pressure fluid flow when the pressure of the working fluid approaches the maximum pressure setting of the pressure relief valve which occurs when separate damping orifices are interposed between the stroke control valve and the load sensing valve and between the stroke control valve and the pressure relief valve.
Figure 4:
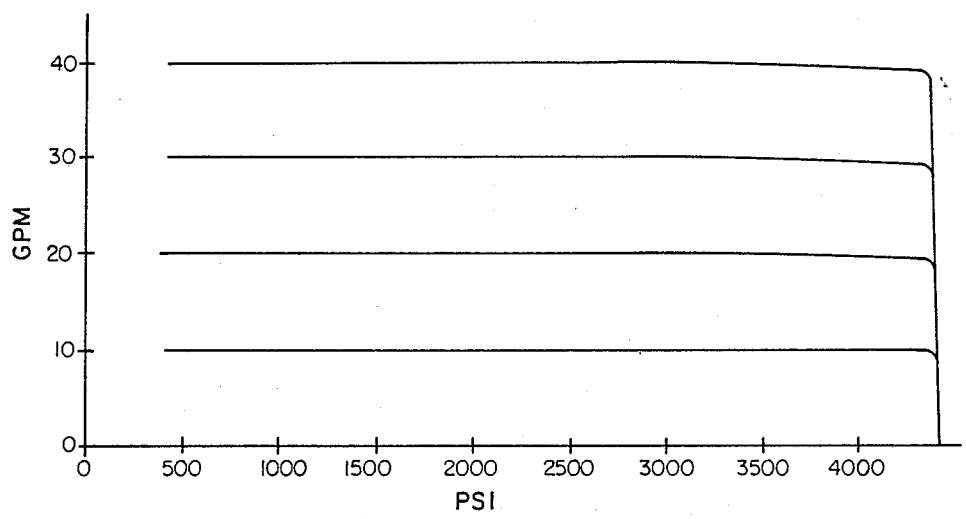
FIG. 4 illustrates an improvement in maintaining a constant working pressure fluid flow as the pressure of the working fluid approaches the maximum pressure setting of the pressure relief valve which occurs when the control incorporates a common damping orifice between the stroke control valve and both the load sensing valve and the pressure relief valve.

Turning to FIG. 3 it may be observed that where the maximum pressure setting of the pump has been set at approximately 4100 psi, as the pressure increases the flow rate in gallons per minute of the working fluid decreases substantially before the set maximum working pressure has been attained. This occurs because the pressure drop across the main stroke control orifice (72) sees a pressure drop from both the damping orifice for the load sensing valve and the damping orifice for the maximum pressure relief valve when the latter valve begins to spill. Accordingly, it has been found that by utilizing a common damping orifice in the fluid conduits leading to both the load sensing valve (34) and the pressure relief valve (32) very little reduction in the flow of working pressure fluid occurs as the output of the pump approaches the setting of the pressure relief valve as may be seen by referring to FIG. 4.

Turning again to FIGS. 1 and 2, it may be observed that in the control of the present invention a control fluid which passes through stroke control valve (30) to either stroking piston port (90) or tank port (92) provides the entire automatic displacement control for pump (10). Such control fluid has a relatively small volume which permits the use of small fluid passages and small valve elements for the stroke control valve (30), the relief valve (32) and the load sensing control valve (34).

Since certain changes may be made to the above described apparatus without departing from the scope of the invention herein it is intended that all matter contained in the description thereof or shown in the accompanying drawings shall be interpreted as illustrative and not in a limiting sense.

We claim:

1. An automatic control for a variable displacement pump having a displacement setting device movable between a maximum displacement position and a minimum displacement position, said device having a stroking piston, a first spring which acts to bias the displacement setting device to the maximum displacement position, a first fluid conduit connected to said stroking piston and adapted to receive or discharge control pressure fluid from said control to move said stroking piston and thereby vary the displacement of said pump, said automatic control comprising;

a pilot operated stroke control having a sleeve, a first port in said sleeve connected to said first fluid conduit, a spool movable in said sleeve, a control land formed on said spool which cooperates with said first port of said sleeve, a source of working pressure fluid, second fluid conduit means for connecting said working pressure fluid to one side of said control land, a case adapted to receive low pressure fluid, third fluid conduit means for connecting said pressure fluid to the other side of said land, said spool movable between a first control position in which said control land blocks said case pressure fluid from said first port and connects said control pressure fluid source to said said first port to overcome the force of said first spring and bias said stroking piston to a position of reduced pump displacement and a second control position in which said control land blocks said control pressure fluid source from said first port and connects said case pressure fluid to said first port to drain fluid from said first fluid conduit to allow said first spring to bias said stroking piston to a position of increased pump displacement with a third control position in which said control land blocks both said control pressure fluid source and said case pressure fluid from said port to substantially maintain the set pump displacement, second spring means for biasing said control spool to said second ,control, position, a first control orifice formed in said spool piston, a source of pilot fluid and fourth fluid conduit means for connecting said pilot fluid to the upstream side of said first control orifice wherein said stroke control spool will shift to said first control position when the flow of pilot fluid causes a pressure drop which overcomes the force of said second spring means;

a pilot relief valve which provides the maximum pressure setting for said pump; and wherein said second spring means comprises a light spring having a relative low spring rate to offset the stroke control spool to said second control position and a second spring acting in series with said first spring having a relatively high spring rate, wherein said stroke control spool first overcomes said first spring force and said second spring functions to provide a high rate of change of force on the stroke control spool when the spool is moving between said second control position and said first control position.

2. An automatic control for a variable displacement pump having a displacement setting device movable between a maximum displacement position and a minimum displacement position, said device having a stroking piston, a first spring which acts to bias the displacement setting device to the maximum displacement position, a first fluid conduit connected to said stroking piston and adapted to receive or discharge control pressure fluid from said control to move said stroking piston and thereby vary the displacement of said pump, said automatic control comprising:

a pilot operated stroke control having a sleeve, a first port in said sleeve connected to said first fluid conduit, a spool movable in said sleeve, a control land formed on said spool which cooperates with said first port of said sleeve, a source of working pressure fluid, second fluid conduit means for connecting said working pressure fluid to one side of said control land, a case adapted to receive low pressure fluid, third fluid conduit means for connecting said case pressure fluid to the other side of said land, said spool movable between a first control position in which said control land blocks said case pressure fluid from said first port and connects said control pressure fluid source to said first port to overcome the force of said first spring and bias said stroking piston to a position of reduced pump displacement and a ;;second control position in which said control land blocks said control pressure fluid source from said first port and connects said case pressure fluid to said first port to drain fluid from said first fluid conduit to allow said first spring to bias said stroking piston to a position of increased pump displacement with a third control position in which said control land blocks both said control pressure fluid source and said case pressure fluid from said port to substantially maintain the set pump displacement, second spring means for biasing said control spool to said second control position, a first control orifice formed in said spool, a source of pilot fluid and fourth fluid conduit means for connecting said pilot fluid to the upstream side of said first control orifice wherein said stroke control spool will shift to said first control position when the flow of pilot fluid causes a pressure drop which overcomes the force of said second spring means;

a pilot relief valve which provides the maximum pressure setting for said pump;

fifth fluid conduit means for connecting said pilot relief valve to the downstream side of said first control orifice for receipt of pilot fluid therefrom to enable said pilot fluid to flow through said first control orifice when the maximum pressure setting for said pump is attained;

a load sensing relief valve which provides a load modulated pressure setting for said pump having an inlet port and an exhaust port connected to case;

load responsive pressure setting means for said load sensing relief valve;

sixth pilot fluid conduit means for connecting said inlet port of said load sensing relief valve to the downstream side of said first control orifice for receipt of pilot fluid therefrom;

wherein said load sensing relief valve is movable between a first position in which said sixth pilot fluid conduit is blocked and a second position in which said sixth fluid conduit is connected to case to enable said pilot fluid to flow through said first control orifice when the setting of said load responsive pressure setting means of said load sensing relief valve is attained; and a damping orifice positioned downstream of said control orifice and common to both said fifth and said sixth pilot fluid conduit means.

3. The automatic control of claim 2, in which said second spring means comprises a light spring having a relative low spring rate to offset the stroke control spool to said second control position and a second spring acting in series with said first spring having a relatively high spring rate, wherein said stroke control spool first overcomes said first spring force and said second spring functions to provide a high rate of change of force on the stroke control spool when the spool is moving between said second control position and said first control position.

4. The control of claim 3, in which said second spring means comprises an adjustment means for setting a desired additional pilot fluid pressure drop for said pilot operated stroke control valve to be added to the setting of said pilot relief valve and said load sensing relief valve when either is driving said stroke control valve.

5. The control of claim 2, in which said load responsive pressure setting means comprises a first spring for providing an additional pilot fluid pressure drop for said pilot operated stroke control valve when it is being driven by said load sensing relief valve.

* * * * *